US011341158B2

(12) United States Patent
Ginkel et al.

(10) Patent No.: US 11,341,158 B2
(45) Date of Patent: *May 24, 2022

(54) CLUSTER-BASED BUSINESS PROCESS MANAGEMENT THROUGH EAGER DISPLACEMENT AND ON-DEMAND RECOVERY

(71) Applicant: SAP SE, Walldorf (DE)

(72) Inventors: Thilo-Alexander Ginkel, Heidelberg (DE); Matthias Miltz, Heidelberg (DE); Soren Balko, Weinheim (DE); Boris Klinker, Karlsruhe (DE)

(73) Assignee: SAP SE, Walldorf (DE)

( * ) Notice: Subject to any disclaimer, the term of this patent is extended or adjusted under 35 U.S.C. 154(b) by 521 days.

This patent is subject to a terminal disclaimer.

(21) Appl. No.: 15/413,330

(22) Filed: Jan. 23, 2017

(65) Prior Publication Data

US 2017/0132256 A1    May 11, 2017

Related U.S. Application Data

(63) Continuation of application No. 12/334,414, filed on Dec. 12, 2008, now Pat. No. 9,588,806.

(51) Int. Cl.
*G06F 16/27* (2019.01)
*G06F 16/20* (2019.01)
(Continued)

(52) U.S. Cl.
CPC .............. *G06F 16/27* (2019.01); *G06F 9/466* (2013.01); *G06F 9/4856* (2013.01); *G06F 16/20* (2019.01);
(Continued)

(58) Field of Classification Search
CPC .......... G06F 16/27; G06F 16/20; G06F 9/466; G06F 9/4856; G06F 16/284;
(Continued)

(56) References Cited

U.S. PATENT DOCUMENTS

| | | | | |
|---|---|---|---|---|
| 6,003,011 A | * | 12/1999 | Sarin | G06Q 10/04 705/7.26 |
| 6,289,410 B1 | * | 9/2001 | Cummins | G06F 9/52 710/200 |

(Continued)

FOREIGN PATENT DOCUMENTS

WO    WO-2006107531 A2    10/2006

OTHER PUBLICATIONS

Andrew S. Tanenbaum and Maarten Van Steen, "Distributed Systems Principles Principles and Paradigms", Second Edition, .COPYRGT. 2007 Pearson Education, Inc., ISBN: 0-13-239227-5.

(Continued)

*Primary Examiner* — Pierre M Vital
*Assistant Examiner* — Andalib F Lodhi
(74) *Attorney, Agent, or Firm* — Mintz Levin Cohn Ferris Glovsky and Popeo, P.C.

(57) ABSTRACT

Methods and apparatus, including computer program products, are provided for transporting processes within a distributed computing system, such as a cluster. In one aspect, the computer-implemented method may receive an event at a first node. The event may correspond to a process instance for handling the received event. The process instance may be transported from a second node to the first node. The process instance may be transported from a persistence when the process instance is inactive and, when the process instance is active, the process instance may be persisted to enable transport to the first node. Related apparatus, systems, methods, and articles are also described.

18 Claims, 3 Drawing Sheets

(51) Int. Cl.
    *G06F 9/48*     (2006.01)
    *G06F 9/46*     (2006.01)
    *G06F 16/10*     (2019.01)
    *G06F 16/28*     (2019.01)
    *G06F 16/23*     (2019.01)

(52) U.S. Cl.
    CPC .......... *G06F 16/10* (2019.01); *G06F 16/2308* (2019.01); *G06F 16/284* (2019.01)

(58) Field of Classification Search
    CPC .... G06F 16/2308; G06F 16/10; G06F 16/583; G06F 16/176; G06F 16/289; G06F 16/1767; G06F 16/1844; G06F 16/182; G06F 16/2228; G06F 16/2365; G06F 16/273; G06F 16/275; G06F 16/278; G06F 16/285; G06F 16/355; G06F 16/951; G06F 16/9574; G06F 16/28; G06F 16/51; G06F 16/248; G06F 16/9535; G06F 16/2255
    See application file for complete search history.

(56) References Cited

U.S. PATENT DOCUMENTS

| | | | |
|---|---|---|---|
| 6,421,700 | B1 | 7/2002 | Holmes et al. |
| 6,826,568 | B2 | 11/2004 | Bernstein et al. |
| 7,472,234 | B2 | 12/2008 | Landry |
| 7,593,429 | B2 | 9/2009 | Jordan et al. |
| 7,813,993 | B1 | 10/2010 | Barto et al. |
| 7,822,658 | B2 | 10/2010 | Casati et al. |
| 7,873,422 | B2 | 1/2011 | Dumas et al. |
| 8,490,172 | B2 | 7/2013 | Legacy et al. |
| 9,588,806 | B2 | 3/2017 | Ginkel et al. |
| 2002/0143646 | A1 | 10/2002 | Boyden et al. |
| 2002/0194495 | A1 | 12/2002 | Gladstone et al. |
| 2003/0018698 | A1 | 1/2003 | Abraham et al. |
| 2003/0101194 | A1 | 5/2003 | Rys et al. |
| 2003/0126235 | A1 | 7/2003 | Chandrasekar et al. |
| 2003/0158839 | A1 | 8/2003 | Faybishenko et al. |
| 2003/0177206 | A1 | 9/2003 | Whitlow |
| 2004/0133591 | A1 | 7/2004 | Holenstein et al. |
| 2004/0148289 | A1* | 7/2004 | Bamford ............. G06F 16/2379 |
| 2005/0038848 | A1 | 2/2005 | Kaluskar et al. |
| 2005/0160145 | A1* | 7/2005 | Gruen .................. G06Q 10/107 709/206 |
| 2005/0246716 | A1 | 11/2005 | Smith et al. |
| 2006/0004852 | A1 | 1/2006 | Abraham et al. |
| 2006/0126619 | A1 | 6/2006 | Teisberg et al. |
| 2006/0136448 | A1 | 6/2006 | Cialini et al. |
| 2006/0212453 | A1* | 9/2006 | Eshel .................. H04L 67/1034 |
| 2007/0022314 | A1 | 1/2007 | Erasani et al. |
| 2008/0082547 | A1 | 4/2008 | Hwang et al. |
| 2008/0147678 | A1* | 6/2008 | Peters .................. H04N 21/232 |
| 2009/0083414 | A1* | 3/2009 | Lazovsky ............. H04L 67/104 709/224 |
| 2009/0138615 | A1 | 5/2009 | Cristallo et al. |
| 2009/0187583 | A1 | 7/2009 | Pape et al. |
| 2009/0328054 | A1* | 12/2009 | Paramasivam ......... G06F 9/505 718/105 |
| 2010/0161817 | A1 | 6/2010 | Xiao et al. |
| 2011/0041006 | A1* | 2/2011 | Fowler .................. G06F 9/5072 714/10 |

OTHER PUBLICATIONS

Dean Jacobs, "Distributed Computing with BEA WebLogic Server", [Online] 2003, Retrieved from the Internet: <URL: http:www.-db.cs.wisc.edu/cidr/cidr2003/program/p26.pdf>, retrieved on Apr. 13, 2011.

Ramez Elmasri and Shamkant B. Navathe, "Fundamentals of Database Systems", 3rd Eddition, .COPYRGT. 2000 by Ramez Elmasri and Shamkant B. Navathe, ISBN 0-8053-1755-4.

Wikipedia for Distributed hash table, last modified on Oct. 6, 2007, retrieved from the Internet: <http://web.archive.org/web/20071012191239/http://en.wikipedia.org/wik- i/Distributed.sub.--hash.sub.--table>.

Zhou et al., "Eager handlers—communication optimization in java-based distributed applications with reconfigurable fine-grained code migration", Paralleland Distributed Processing Symposium, Proceddings 15.sup.th International, San Francisco, CA, Apr. 23-27, 2001, Los Alamitos, CA, USA, IEEE Comput. Soc, Apr. 23, 2001, pp. 1115-1121.

* cited by examiner

CLUSTER-BASED BUSINESS PROCESS MANAGEMENT THROUGH EAGER DISPLACEMENT AND ON-DEMAND RECOVERY

CROSS REFERENCE TO RELATED APPLICATIONS

This application is a continuation of U.S. application Ser. No. 12/334,414, filed on Dec. 12, 2008, and entitled CLUSTER-BASED BUSINESS PROCESS MANAGEMENT THROUGH EAGER DISPLACEMENT AND ON-DEMAND RECOVERY, the disclosure of which is incorporated herein by reference.

FIELD

The present disclosure generally relates to distributed computing.

BACKGROUND

Distributed computing systems are widely used by various organizations to accommodate the ever-increasing demand for the computer resources from consumers and businesses alike. In a distributed computing system, nodes (e.g., computers, processors, servers, etc.) are grouped or clustered to perform certain functions. For example, a cluster may be configured as a collection of nodes that work together to perform a function and, in most instances, share a resources, such as a common database. The nodes of a cluster are usually coupled by a network.

SUMMARY

The subject matter disclosed herein provides methods and apparatus, including computer program products, for transporting processes within a distributed computing system, such as a cluster of computers.

In one aspect, there is provided a computer-implemented method for transporting processes within a distributed computing system, such as a cluster. In one aspect, the computer-implemented method may receive an event at a first node. The event may correspond to a process instance for handling the received event. The process instance may be transported from a second node to the first node. The process instance may be transported from a persistence (like a database which may be shared among nodes), when the process instance is inactive and, when the process instance is active, the process instance may be persisted to enable transport to the first node.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Like labels are used to refer to same or similar items in the drawings.

DETAILED DESCRIPTION

Cluster computers may be used to improve scalability, throughput, and the reliability of business applications. For example, computer nodes interconnected by a network and sharing a joint database instance may be configured as a cluster of nodes (also referred to as computer nodes) to jointly process one or more concurrently running tasks. These tasks may be expressed as a process, such as a business process run by a business process management application. In the course of the operation of a process instance, the process instance may frequently receive one or more events from a user or another system (e.g., a backend application, such as a messaging system or a task management system). A process instance refers to a specific instance of a particular process. The event may be received at a node A of the cluster, but the process instance for handling the event may be located at another node B. For example, with node A and node B uniquely identifying distinct nodes within the cluster. The subject matter described herein may provide a transactionally safe protocol for transporting a process instance from a node B of the cluster to the node A of the cluster (which is the node where the event is received) and to deliver the event to the process instance.

In some implementations, the business processes need to interoperate with backend business applications with transactional guarantees (e.g., ACID compliance). Moreover, cluster installations are typically a cost-efficient way to achieve "scalability" (e.g., better execution throughput for high workloads, such as concurrently running processes). In cluster installations, events (originating from a backend application) may be received at a node A, whereas the business process which needs to consume this event resides at another node B. The subject matter described herein relates to a mechanism for providing full transactional guarantees for this consumption of an event that is received at another node in the absence of infrastructure support for distributed transactions among nodes. Full transactional guarantees refers to one or more of the following: atomicity, consistency, isolation, and durability (which is typically referred to as ACID compliance).

Figure 1:
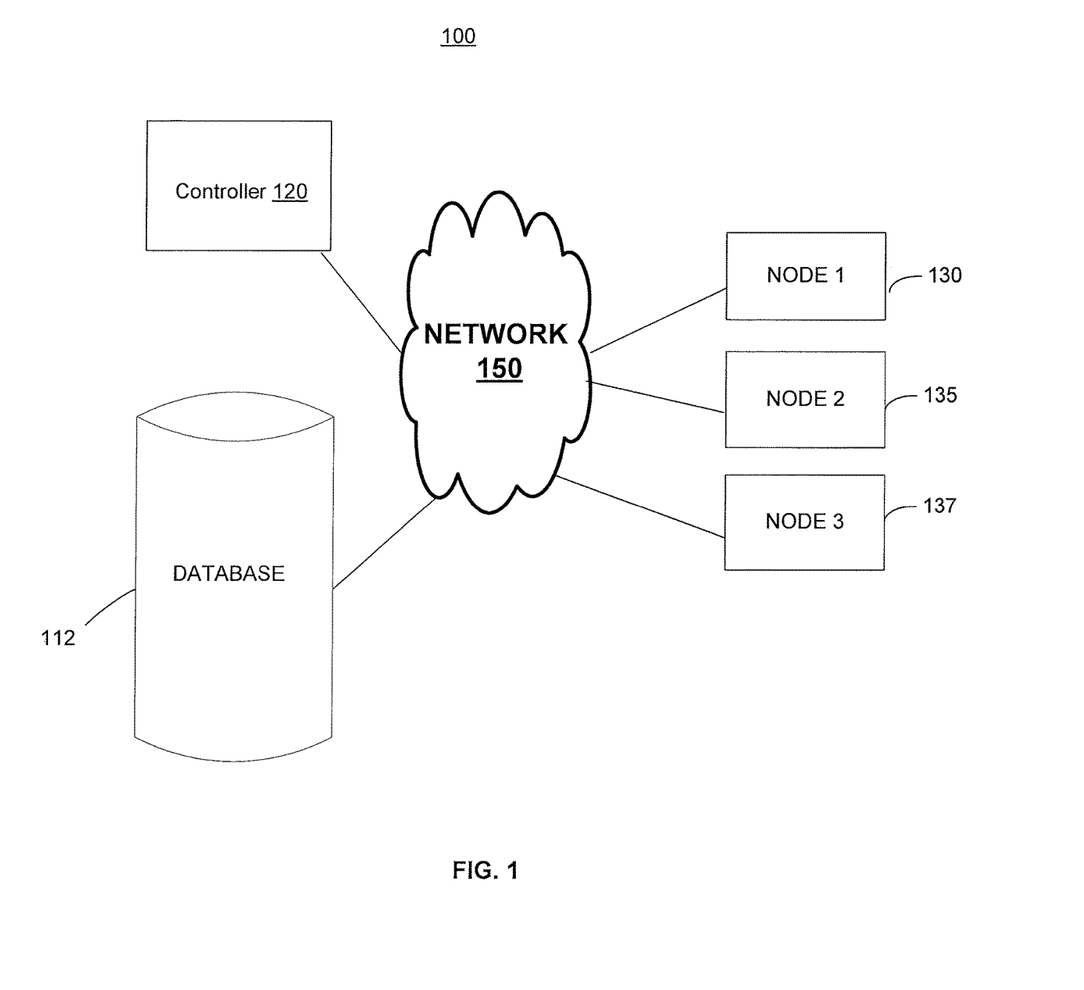
FIG. 1 depicts a block diagram of a distributed computing system, such as cluster system 100.

FIG. 1 depicts a distributed computing system 100 (also referred to as a cluster) including one or more nodes, such as nodes 130-137, a controller 120, and a database 112, all of which are coupled by a communication mechanism, such as network 150. Although FIG. 1 only depicts three nodes of the cluster 100, other quantities of nodes may be implemented as well.

The nodes 130-137 may be implemented as any type of processor, such as a computer, a blade, a server, and the like. The database 112 may be implemented as any type of database which supports transactions (which in some cases excludes plain file systems). Moreover, the nodes 130-137 may be configured as a cluster in which the nodes operate on database 112. The network 150 may be any type of communications mechanism and may include, alone or in any suitable combination, the Internet, a telephony-based network, a local area network (LAN), a wide area network (WAN), a dedicated intranet, wireless LAN, an intranet, a wireless network, a bus, or any other communication mechanisms.

The controller 120 may be used to transport a process instance from a node to another node. For example, an event, such as a message, a call, a data object, or the like, may be received at a node. The event may have a corresponding process instance for processing the received event. However, in a cluster system 100, the process instance for that event may be located at another node. When that is the case, controller 120 may transport the process instance from whichever node has the process instance to the node at which the event was received. Although controller 120 is depicted at FIG. 1 as separate from nodes 130-137, the controller 120 may be located anywhere and distributed in multiple locations (although typically a controller is included in each node). In some implementations, the controller 120 may be integrated with a cluster management system, although the controller 120 may be used independently or with other systems as well.

Figure 2:
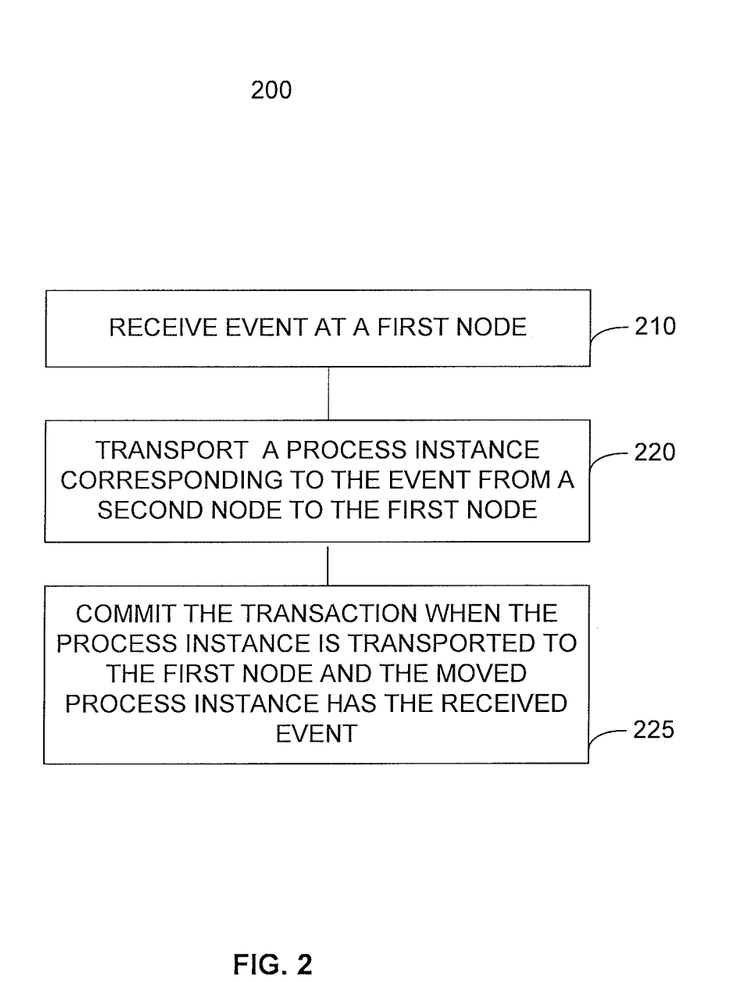
FIG. 2 depicts a process 200 for transporting processes within system 100.

FIG. 2 depicts a process 200 for transporting events in the cluster system 100. The description of FIG. 2 will also refer to FIG. 1.

At 210, an event is received at a first node. For example, node 130 may receive an event from another user, such as a user interface (e.g., a Web browser), another node, or an external system. The event received at node 130 may have a corresponding process instance, which is not located at node 130, to handle the event. The event may, for example, be the notification of task completion originating from a task management application. The event may include the user inputs from that completed task and may be directed to a particular process instance. The process instance currently waits for this event to proceed in its operations (e.g., execute the next step like activate the subsequent task).

At 220, the process instance related to the received event is transported to the node, which received the event. For example, controller 120 may determine that the process instance for handling the received event is located at node 135. In this example, controller 120 transports the process instance for the received event from node 135 to node 130. Specifically, node 135 may persist the process instance to database 112, so that the persisted process instance may be transported to node 130 (e.g., fetched from the database by node 130). Moreover, if the process instance is active (e.g., currently being used at node 135, such as by executing other activities of that process instance), node 135 may wait before persisting the process instance and/or transporting the process instance (e.g., wait until the process has completed all running activities.)

Figure 3:
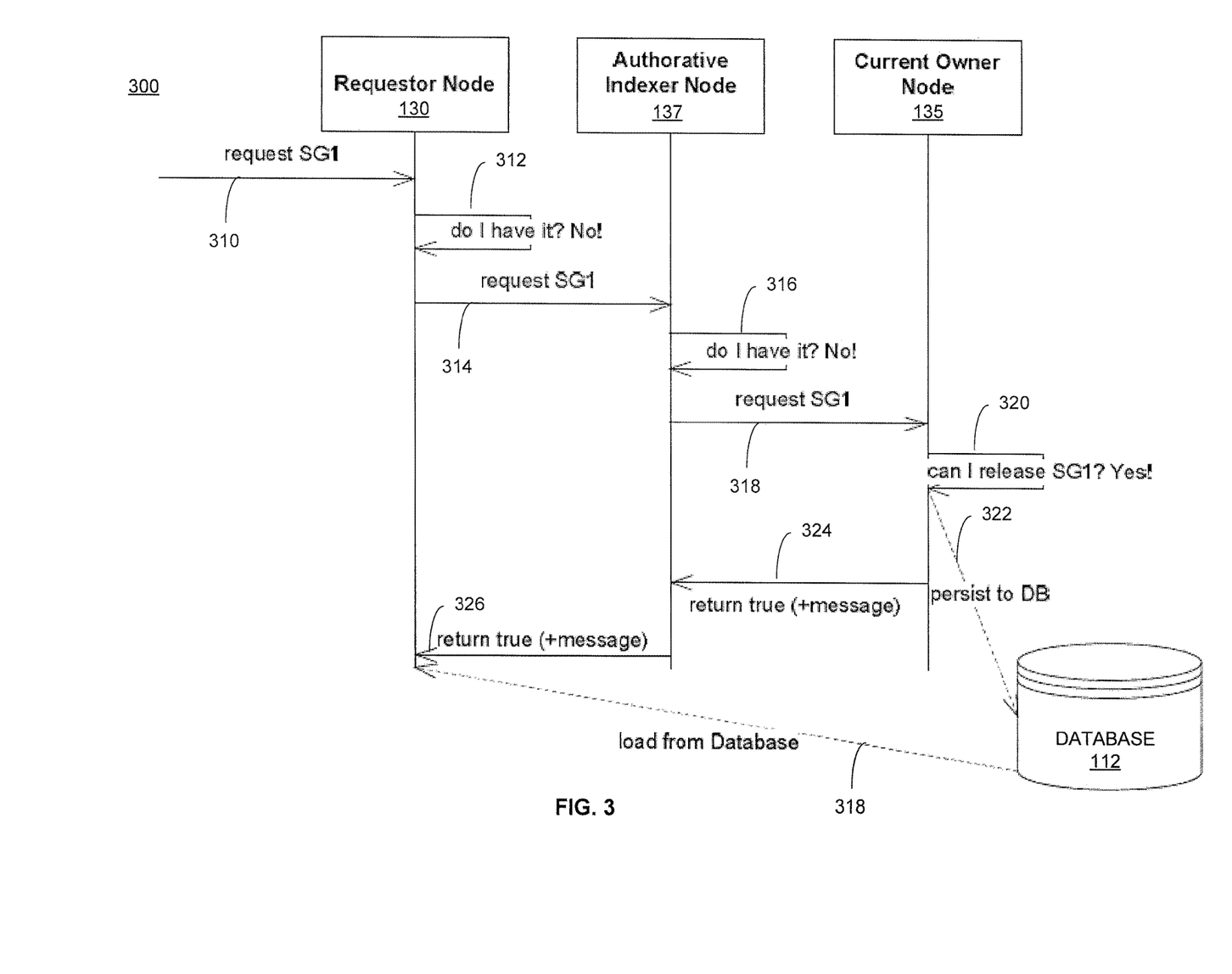
FIG. 3 depicts another process 300 for transporting processes within system 100.

A process instance may be represented as a set of state variables representing the local data that the process operates on (e.g., process context) and a set of tokens and their position in the control flow graph. The state variables that make up a process instance are jointly written to the database 112. Node 135 then reports to node 130 (e.g., by sending a response message over the network) that the process instance is ready to be read from the database. Upon receiving this message, node 130 performs a query on the database 112 to read all state variables of that process into main memory, thus, re-establishing the process instance to continue executing (e.g., receiving the message) on node 130. FIG. 3 depicts the concrete message exchange between nodes 130 and 135 and the associated database operations.

The controller 120 may use a variety of techniques, such as hash tables, database look-ups, table look-ups, and the like, to determine the location of the process instances for a given event given an identifier (or key) used to match the event to a process instance. In some implementations, the controller 120 uses a distributed hash table to identify the node where a process instance is located. For example, an authoritative indexer node (which is described further below) may include the distributed hash table. The distributed hash table provides a so-called "lookup" table in which a name-value pair is stored in the distributed hash table, so that the distributed hash table can efficiently lookup a node given a key.

A mechanism to determine the location of a process instance, using distributed hash tables, may be used. For example, each node manages a partition of the distributed hash table, which exclusively contains identities of process instances (e.g., globally unique identifiers) alongside their physical location (e.g., at a node). A node which holds the information of where a particular process instance is located is the so-called "authorative indexer" for this process instance. If node 130 wants to find out where some process instance A is located, node 130 first determines the authoritative indexer of A by applying a hash function on the process identity (which is a GUID). Node 130 then sends a request to the authoritative indexer to return the current physical location of process instance A. The authoritative indexer retrieves this information from its hash table fragment and returns the location to node 130.

Once the process instance is transported to the node 130, the transaction is committed at 225. The event is typically delivered to node 130 in a transaction, which is then committed after successful transport of the process instance and delivery of the event to this process instance. Moreover, node 130 may have a corresponding transaction TX1 (also referred to as a database transaction) for database 112. The database transaction represents one or more database operations (e.g., a create, a read, an update, a delete, a select, and the like) processed as a unit. Moreover, the transaction may be committed to the database 112 or, otherwise, any changes made to database 112 may be rolled back to a state prior to the database transaction. Within the given example, the event is delivered to node 130 within transaction TX1, i.e., the data which makes up the event is fetched from the database. At 225, controller 120 may not commit the transaction TX1 until after the process instance is successfully transported to node 130 (which is the node that received the event) and the event is delivered to the relocated process instance at node 130. Even if the process was transported to the node, the transported process has not yet seen the event. Take the task completion event as an example, the process provides an interface to get this event delivered. The process is thus able to process this event only when the event is delivered to the process.

In some implementations, transporting the process instance from node 135 to node 130 may occur in a separate transaction TX2, which is decoupled from TX1. Moreover, transporting a process instance between the nodes may be performed using a so-called "eager displacement" mechanism for a process when it becomes inactive and "on-demand recovery" to make a process instance active, again. A process instance is active if it is currently executing activities. The process instance is inactive if it waits for an incoming event to continue executing activities. The "eager displacement" mechanism kicks in to immediately displace a process instance from main memory (e.g., store it on the database) as soon as a process becomes inactive (e.g., starts waiting for an event to continue executing activities). This mechanism saves the persisting of the process on node 135 at a later point in time (e.g., when being asked to transport the process). On-demand recovery denotes the mechanism that fetches a process instance from persistence (e.g., a disk) to make it active again.

To illustrate eager displacement, the following example is provided. When a process instance at node 135 becomes inactive (e.g., suspending execution of activities and waiting for an event to proceed), the process instance may persist its current state to the shared database 112 (e.g., within a transaction TXO) and displace all residuals from the main memory of the node 135. When an event is received at 210 corresponding to the so-called "inactive" process that was persisted to database 112 before, the on-demand recovery mechanism is used to transport, at 220, the process instance from node 135 to node 130. For example, transporting a process instance may include fetching the state variables (e.g., process context variables, tokens, etc.) that make up the process from the database. This is due to the fact that the process instance was eagerly displaced from node 135 (and written to the database at a previous time). In some implementations, a process instance is generally a closed set of state variables, all of which are jointly transported.

To further illustrate, when the process instance at node 135 is still active and the event is received at 210, the process instance may not be eagerly displaced as it still actively executes its business logics and resides in the main memory of node 135. Once the event comes is received at node 130, controller 120 may send a synchronous request (e.g., such as a message, remote method invocation, and the like) to release (e.g., displace from main memory) the corresponding process instance at node 135. In this example, node 135 typically will only respond to the request for the process instance, once the process instance has become inactive (e.g., completed a currently running activity) and is displaced onto the database 112. In some implementations, a timeout mechanism is used to return a fault message to the caller, i.e., node 130, when the process instance cannot be displaced in a reasonable amount of time. When that is the case, node 130 may then abort (e.g., roll back) the transaction TX1, which delivered the event at 210.

FIG. 3 depicts a process 300 for transporting process instances.

At 310, an event (labeled as "request SG1") is the response of node 130 to receiving the event from an external application (not depicted in this sequence diagram). For example, node 130 determines that the received event is to be delivered to process instance SG1. For example, a user may select a work item on a task management user interface, which results in an event (e.g., a message, a Web Service call, a remote method invocation (RMI) call, and the like) provided (e.g., sent) to node 130 within a database transaction TX1.

In the implementation of FIG. 3, nodes may perform one or more of the following functions: a storage group requestor node, an authoritative indexer node, and a current owner node. For example, a store group requestor node 130 may make a request 314 to an authoritative indexer node 137, and the request may ask for transporting the process instance (referred to as SG1) for the event received at 310 to node 130. The authoritative indexer node 137 may determine the location of the process instance for handling event 310. For example, the authoritative indexer node may include a distributed hash table to determine the location of the process instance. The current owner node 135 represents the node where the process instance is located. The function of a storage group requestor node 130, an authoritative indexer node 137, and a current owner node 135 may reside in a single node or in a plurality of nodes. Typically, any node is prepared to be in any of these roles, depending on the circumstances. For example, if an event is received at some node A, it automatically assumes the storage group requestor role. The node B does have the authoritative indexer role for any process instances residing in its distributed hash table partition. Node C is the current owner of all process instances that are active (e.g., which reside in main memory) of that node.

For example, in a cluster system 100 (which in this example includes tens if not hundreds of nodes), the storage group requestor node may be node 130, the authoritative indexer node may be node 137, and the current owner node 135. Alternatively, node 130 may be implemented to include the function of the storage group requestor node and the authoritative indexer node, and node 135 may function as the current owner node. In any case however, process 300 requires at most three nodes to determine where the corresponding process instance is located to handle the event received at 310. In some implementations, the time to locate a process instance is of deterministic $O(1)$ (i.e., constant) runtime complexity. As such, this protocol using a storage group requestor node, an authoritative indexer node, and a current owner node may, in some implementations, provide an efficient mechanism to determine the location of a process instance in a cluster system that scales from only a few nodes to tens, if not, hundreds of nodes.

At 312, node 130 determines whether the process instance to handle the request received at 310 is already located at node 130. For example, node 130 determines that the received event is to be delivered to process instance SG1. Node 130 then determines the location of process instance SG1 (i.e., a cluster node) and, if the process instance to handle that event is not yet present on node 130, initiates transport of the process instance to node 130. The received event may include an identifier (e.g., "SG1", also referred to as a key) to locate a process instance at node 130 for handling the received event by comparing the identifier (which may be included in the request) to a list of process instances at node 130 (e.g., comparing using the distributed hash table).

At 314, if the process instance for the received event is not at node 130, node 130 makes a request to node 137, which is the authoritative indexer node for the receiving process instance SG1. The authoritative indexer node 137 may use the identifier "SG1" to determine, using a distributed hash table, the owner node hosting the process instance for the received event. At 316, if node 137 has the process instance, then authoritative indexer node 137 functions as the current owner node for process instance "SG1", as described below with respect to 318-326.

At 318, authoritative indexer node 137 does not have the process instance being sought, so node 137 sends a request to the current owner node 135, which was determined using the distributed hash table. Current owner node 135 then determines whether it can release the process instance. For example, if the process instance is active as noted above, the current owner node 135 may wait until the process instance becomes inactive. Alternatively, owner node 135 might also implement a mechanism which actively forces the process instance to become inactive and be displaced onto the database. In the extreme case, all running steps of that process instance would be aborted and rolled back to make the process instance inactive.

At 320, current owner node determines that the process instance may be released (e.g., because it has become inactive) and thus persisted, at 322, to database 112 within a transaction TX2. Once the transaction TX2 has successfully committed and the process instance was displaced from node 135, at 324-326, current owner node 135 sends a message back to authoritative indexer node 137 and requestor node 130 to indicate that the process instance has been released and that the process instance can be loaded from persistency at database 112 within transaction TX1. At 328, the process instance is located to node 130 from database 112.

An active process may represent a process which currently executes business logic (i.e., activities) and resides in main memory. An inactive process may represent a process which is business logic not currently being executed (e.g., waiting for an event to resume its operations) and was displaced from main memory to persistence.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Moreover, any network topology, network protocol, and persistence may be used as well. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A computer-implemented method comprising:
receiving, via a communications network and by a first computing device of a plurality of devices in a distributed computing system, an event within a database transaction, wherein the event corresponds to an instance of a process for executing logic in response to the received event, wherein the logic is associated with one or more activities, wherein the instance comprises the logic and a set of state variables representing local data that the instance operates on, and wherein the database transaction includes operations on a joint database shared by the plurality of devices;
detecting that an activity of the one or more activities is being performed at a second computing device of the plurality of devices;
determining, by the first computing device and in response to detecting that the activity of the one or more activities is being performed at the second computing device of the plurality of devices, that the instance is located at the second computing device;
requesting, by the first computing device and in response to determining that the instance is located at the second computing device, that the instance be transported, via the joint database, to the first computing device and from the second computing device;
receiving, by the first computing device, an indication that the instance may be read from the joint database, wherein the indication is received in response to the instance being transported from the second computing device to the joint database;
transporting, by the first computing device and based on receiving the indication, the instance from the joint database to the first computing device, wherein transporting the instance from the joint database to the first computing device comprises reading the logic and the set of state variables from the joint database into a main memory at the first computing device, wherein an owner node of the instance is changed from the second computing device to the first computing device in response to the instance being transported from the joint database to the first computing device;
delivering, within the first computing device, the event to the instance; and
processing, by the first computing device, the event based on the received instance.

2. The computer-implemented method of claim 1, further comprising:
processing the event based upon the logic;
committing, after the event is delivered to the instance, the database transaction to the joint database.

3. The computer-implemented method of claim 1, wherein determining that the instance is located at the second computing device further comprises:
determining, based upon applying a hash function to an identifier associated with the process, an identity of a third computing device of the plurality of devices, the third computing device acting as an authoritative indexer for the distributed computing system; and
requesting, from the third computing device, a location of the instance within the distributed computing system.

4. The computer-implemented method of claim 1, wherein determining that the instance is located at the second computing device further comprises:
determining, based upon an identifier associated with the process, a location of the instance by looking up the identifier in a hash table.

5. The computer-implemented method of claim 1, wherein requesting that the instance be transported comprises requesting that the second computing device persist the instance from main memory at the second computing device to the joint database.

6. The computer-implemented method of claim 1, wherein the instance is transported from the second computing device to the joint database when the instance becomes inactive at the second computing device.

7. The computer-implemented method of claim 6, wherein the instance is active at the second computing device when the second computing device is executing the one or more activities of the logic, and wherein the instance is inactive at the second computing device when the second computing device is not executing the one or more activities of the logic.

8. The computer-implemented method of claim 6, wherein the instance is persisted to a database layer of the joint database when the instance is transported from the second computing device to the joint database.

9. The computer-implemented method of claim 1, wherein the second computing device is separate from the first computing device.

10. The computer-implemented method of claim 1, wherein the event is received from a backend system and comprises at least one of a message, a call, and a data object.

11. A non-transitory machine readable storage device containing instructions to configure at least one processor to perform operations comprising:
    receiving, via a communications network and by a first computing device of a plurality of devices in a distributed computing system, an event within a database transaction, wherein the event corresponds to an instance of a process for executing logic in response to the received event, wherein the logic is associated with one or more activities, wherein the instance comprises the logic and a set of state variables representing local data that the instance operates on, and wherein the database transaction includes operations on a joint database shared by the plurality of devices;
    detecting that an activity of the one or more activities is being performed at a second computing device of the plurality of devices;
    determining, by the first computing device and in response to detecting that the activity of the one or more activities is being performed at the second computing device of the plurality of devices, that the instance is located at the second computing device;
    requesting, by the first computing device and in response to determining that the instance is located at the second computing device, that the instance be transported, via the joint database, to the first computing device and from the second computing device;
    receiving, by the first computing device, an indication that the instance may be read from the joint database, wherein the indication is received in response to the instance being transported from the second computing device to the joint database;
    transporting, by the first computing device and based on receiving the indication, the instance from the joint database to the first computing device, wherein transporting the instance from the joint database to the first computing device comprises reading the logic and the set of state variables from the joint database into a main memory at the first computing device, wherein an owner node of the instance is changed from the second computing device to the first computing device in response to the instance being transported from the joint database to the first computing device;
    delivering, within the first computing device, the event to the instance; and
    processing, by the first computing device, the event based on the received instance.

12. The non-transitory machine readable storage device of claim 11, wherein the operations further comprise:
    processing the event based upon the logic;
    committing, after the event is delivered to the instance, the database transaction to the joint database.

13. The non-transitory machine readable storage device of claim 11, wherein determining that the instance is located at the second computing device further comprises:
    determining, based upon applying a hash function to an identifier associated with the process, an identity of a third computing device of the plurality of devices, the third computing device acting as an authoritative indexer for the distributed computing system; and
    requesting, from the third computing device, a location of the instance within the distributed computing system.

14. The non-transitory machine readable storage device of claim 11, wherein requesting that the instance be transported comprises requesting that the second computing device persist the instance from main memory at the second computing device to the joint database.

15. A system comprising:
    at least one processor; and
    a memory, the at least one processor and the memory configured to perform operations comprising:
        receiving, via a communications network and by a first computing device of a plurality of devices in a distributed computing system, an event within a database transaction, wherein the event corresponds to an instance of a process for executing logic in response to the received event, wherein the logic is associated with one or more activities, wherein the instance comprises the logic and a set of state variables representing local data that the instance operates on, and wherein the database transaction includes operations on a joint database shared by the plurality of devices;
        detecting that an activity of the one or more activities is being performed at a second computing device of the plurality of devices;
        determining, by the first computing device and in response to detecting that the activity of the one or more activities is being performed at the second computing device of the plurality of devices, that the instance is located at the second computing device;
        requesting, by the first computing device and in response to determining that the instance is located at the second computing device, that the instance be transported, via the joint database, to the first computing device and from the second computing device;
        receiving, by the first computing device, an indication that the instance may be read from the joint database, wherein the indication is received in response to the instance being transported from the second computing device to the joint database;
        transporting, by the first computing device and based on receiving the indication, the instance from the joint database to the first computing device, wherein transporting the instance from the joint database to the first computing device comprises reading the logic and the set of state variables from the joint database into a main memory at the first computing device, wherein an owner node of the instance is changed from the second computing device to the first computing device in response to the instance being transported from the joint database to the first computing device;
        delivering, within the first computing device, the event to the instance; and
        processing, by the first computing device, the event based on the received instance.

16. The system of claim 15, wherein the operations further comprise:
- processing the event based upon the logic;
- committing, after the event is delivered to the instance, the database transaction to the joint database.

17. The system of claim 15, wherein determining that the instance is located at the second computing device further comprises:
- determining, based upon applying a hash function to an identifier associated with the process, an identity of a third computing device of the plurality of devices, the third computing device acting as an authoritative indexer for the distributed computing system; and
- requesting, from the third computing device, a location of the instance within the distributed computing system.

18. The system of claim 15, wherein requesting that the instance be transported comprises requesting that the second computing device persist the instance from main memory at the second computing device to the joint database.

* * * * *